United States Patent
Jiang et al.

(10) Patent No.: US 12,278,938 B2
(45) Date of Patent: Apr. 15, 2025

(54) MIXED REALITY DISPLAY METHOD, MIXED REALITY DEVICE, AND STORAGE MEDIUM

(71) Applicants: Beijing BOE Optoelectronics Technology Co., Ltd., Beijing (CN); BOE Technology Group Co., Ltd., Beijing (CN)

(72) Inventors: Qianwen Jiang, Beijing (CN); Hao Zhang, Beijing (CN); Lili Chen, Beijing (CN); Peng Han, Beijing (CN); Huidong He, Beijing (CN); Juanjuan Shi, Beijing (CN); Weihua Du, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/036,379

(22) PCT Filed: Dec. 21, 2020

(86) PCT No.: PCT/CN2020/138106
§ 371 (c)(1),
(2) Date: May 10, 2023

(87) PCT Pub. No.: WO2022/133683
PCT Pub. Date: Jun. 30, 2022

(65) Prior Publication Data
US 2023/0403382 A1 Dec. 14, 2023

(51) Int. Cl.
H04N 13/156 (2018.01)
H04N 13/15 (2018.01)
H04N 13/383 (2018.01)

(52) U.S. Cl.
CPC .......... *H04N 13/156* (2018.05); *H04N 13/15* (2018.05); *H04N 13/383* (2018.05)

(58) Field of Classification Search
CPC .... H04N 13/156; H04N 13/15; H04N 13/383; H04N 23/60; G06F 3/013; G06T 7/11
See application file for complete search history.

(56) References Cited

U.S. PATENT DOCUMENTS 10,819,898 B1 * 10/2020 Han .................... G02B 27/017
11,113,880 B1 *  9/2021 LaFayette ............ G06T 17/205
(Continued)

FOREIGN PATENT DOCUMENTS

| CN | 107908002 A | 4/2018 |
| CN | 109801353 A | 5/2019 |

(Continued)

OTHER PUBLICATIONS

PCT/CN2020/138106 international search report.

*Primary Examiner* — Gims S Philippe
(74) *Attorney, Agent, or Firm* — IPro, PLLC

(57) ABSTRACT

Provided are a mixed reality display method, a mixed reality device, and a storage medium. The method includes: after receiving a mixed display signal, tracking the eyeballs of a user by means of an eyeball tracker, and determining a gaze point of the user on a display screen; determining, according to a correspondence between the gaze point and a sub-display region in the display screen, the sub-display region the user gazes; determining at least one first image sensor according to a correspondence between the sub-display region and an image sensor in an image sensor array, and adjusting the at least one first image sensor; and superimposing and rendering an environment image output by the image sensor array and a virtual image, and obtaining and displaying an MR image.

18 Claims, 9 Drawing Sheets

(56) References Cited

U.S. PATENT DOCUMENTS

| | | | |
|---|---|---|---|
| 2019/0197765 A1 | 6/2019 | Molyneaux et al. | |
| 2020/0160602 A1* | 5/2020 | Ghatak | G06Q 30/0242 |
| 2021/0099632 A1* | 4/2021 | Molholm | G06T 15/503 |
| 2021/0104100 A1* | 4/2021 | Whitney | G02B 27/0093 |
| 2021/0358200 A1 | 11/2021 | Wang et al. | |
| 2022/0030148 A1* | 1/2022 | Gruhlke | H04N 23/55 |

FOREIGN PATENT DOCUMENTS

| | | |
|---|---|---|
| CN | 110324601 A | 10/2019 |
| CN | 110378914 A | 10/2019 |
| CN | 111626936 A | 9/2020 |

* cited by examiner

MIXED REALITY DISPLAY METHOD, MIXED REALITY DEVICE, AND STORAGE MEDIUM

CROSS REFERENCE TO RELATED APPLICATIONS

The present disclosure is a US National Stage of International Application No. PCT/CN2020/138106, filed on Dec. 21, 2020, the entire contents of which are incorporated herein by reference.

FIELD

The present disclosure relates to the field of mixed realities, and in particular to a method for displaying a mixed reality, a mixed reality apparatus, and a storage medium.

BACKGROUND

An ultimate goal of the mixed reality (MR) is to mix the virtual world with the real world into one world.

Currently, the most common technology is achievable with the MR glasses. By virtue of optical components of the MR glasses, the information of the virtual world is superimposed on the illumination information of the real world, so as to be jointly input into human eyes for mixed display.

In the related art, for the majority of MR glasses, the superimposition and combination of the virtual world and the real world are dependent on holographic projection. In this way, a field of view is narrow, and a depth of field of an image is far from exquisite.

SUMMARY

The present disclosure provides a method for displaying a mixed reality, a mixed reality apparatus, and a storage medium, so as to solve the technical problems that a field of view is narrow and a depth of field of an image is far from exquisite of mixed reality display in the related art.

In a first aspect, in order to solve the technical problems described above, an embodiment of the present disclosure provides a method for displaying a mixed reality (MR), applied to an MR apparatus. The MR apparatus includes a display screen, an eye tracker on a display surface of the display screen, and an image sensor array on a non-display surface of the display screen, a corresponding relation is between image sensors in the image sensor array and a plurality of display sub-regions in the display screen. A technical solution of the method is as follows:

after receiving a mixed display signal, determining a gaze point of a user on the display screen by tracking an eyeball of the user through the eye tracker;

determining a display sub-region at which the user gazes according to a corresponding relation between gaze points and display sub-regions in the display screen;

determining at least one first image sensor according to the corresponding relation between display sub-regions and image sensors in the image sensor array, and adjusting the at least one first image sensor to increase a resolution of an image generated by the at least one first image sensor, where a distance between a center point of a display sub-region corresponding to the first image sensor and the gaze point is less than a set distance, and fields of view of two adjacent image sensors in the image sensor array partially overlap each other; and obtaining and displaying an MR image by superimposing and rendering an environment image output by the image sensor array and a virtual image.

In a possible implementation mode, the adjusting the at least one first image sensor includes:

determining whether a gaze duration for which the gaze point remains in a display sub-region corresponding to the at least one first image sensor is greater than a preset threshold;

in response to determining that the gaze duration is less than or equal to the preset threshold, increasing the resolution of the image generated by the at least one first image sensor, so as to increase a resolution of a corresponding image; and in response to determining that the gaze duration is greater than the preset threshold, keeping the at least one first image sensor in a working state, and displaying an image output by the at least one first sensor as the environment image in a full-screen mode.

In a possible implementation mode, before the superimposing and rendering the environment image output by the image sensor array and the virtual image, the method further includes:

in response to determining that a total number of image sensors in the working state of the image sensor array is greater than 1, stitching a plurality of images output by the image sensor array into a stitched image; and generating the environment image by adjusting brightness and color of the stitched image.

In a possible implementation mode, the stitching the plurality of images output by the image sensor array into the stitched image includes:

selecting an image from the plurality of images as a reference image, and stitching two adjacent images from the reference image until the plurality of images output by the image sensor array are stitched, where the stitching the two adjacent images is implemented by:

acquiring a plurality of matching points having a same image feature from the two adjacent images;

calculating translation matrixes, rotation matrixes, and intrinsic parameter matrixes corresponding to the plurality of matching points respectively;

calculating a homography matrix of each matching point according to the translation matrix, the rotation matrix, and the intrinsic parameter matrix of each matching point;

calculating each homography matrix through a least median robustness method, selecting matching points corresponding to homography matrixes satisfying a preset quality requirement to form an optimal sub-set, calculating a final homography matrix according to the optimal sub-set, and converting the two adjacent images into images having a same angle of view;

performing coordinate alignment on pixels in the images having the same angle of view, and averaging overlapping pixels to obtain a stitched sub-image of the two adjacent images; and repeatedly executing the stitching the two adjacent images on all stitched sub-images to obtain the stitched image.

In a possible implementation mode, the generating the environment image by adjusting brightness and color of the stitched image includes:

determining a blurred region in the stitched image according to a change in an optical flow field in the stitched image;

obtaining a filtered image by performing bilateral filtering on the blurred region;

performing illumination correction on the filtered image through a preset illumination model; and obtaining the environment image by fusing overlapping regions of two adjacent images corresponding to the blurred region according to a weight.

In a possible implementation mode, the obtaining and displaying the MR image by superimposing and rendering the environment image output by the image sensor array and the virtual image includes:

determining a position of a preset object in the environment image when the mixed display signal is a dynamic mixed display signal;

moving a virtual image of a virtual object in a current frame to the position, and adjusting an angle and a size of the virtual image; and obtaining the MR image by adjusting illumination and a shadow effect of the virtual image according to illumination detected in a real environment, and transmitting the MR image to the display screen for display.

In a possible implementation mode, the determining the position of the preset object in the environment image includes:

extracting a plurality of feature points from the environment image;

matching the plurality of feature points with feature points of the preset object; and determining a position of a successfully-matched feature point in the environment image as the position of the preset object in the environment image.

In a possible implementation mode, the obtaining and displaying the MR image by superimposing and rendering the environment image output by the image sensor array and the virtual image includes: obtaining and displaying the MR image by superimposing and rendering a static virtual image on the environment image when the mixed display signal is a static mixed display signal.

In a possible implementation mode, the method further includes: when a virtual display signal is received, turning of the image sensor array, and displaying an image of a virtual world.

In a possible implementation mode, the method further includes: displaying the environment image when a live display signal is received.

In a second aspect, an embodiment of the present disclosure provides a mixed reality apparatus. The mixed reality apparatus includes:

a display screen; an eye tracker on a display surface of the display screen; an image sensor array on a non-display surface of the display screen, where a corresponding relation is between image sensors in the image sensor array and a plurality of display sub-regions in the display screen; and a driving circuit configured to control the eyeball tracker to track an eye of a user, so as to determine a gaze point of the user on the display screen after receiving a mixed display signal; determine, according to a corresponding relation between gaze points and display sub-regions in the display screen and the corresponding relation between display sub-regions and image sensors in the image sensor array, at least one first image sensor corresponding to the gaze point; adjust the at least one first image sensor, so as to increase a resolution of an image generated by the at least one first image sensor, where a distance between a center point of a display sub-region corresponding to the first image sensor and the gaze point is less than a set distance, and fields of view of two adjacent image sensors in the image sensor array partially overlap each other; and superimpose and render an environment image output by the image sensor array and a virtual image, so as to obtain and display an MR image.

In a possible implementation mode, the driving circuit is further configured to:

determine whether a gaze duration for which the gaze point remains in a display sub-region corresponding to the at least one first image sensor is greater than a preset threshold;

increase, in response to determining that the gaze duration is less than or equal to the preset threshold, the resolution of the image generated by the at least one first image sensor, so as to increase a resolution of a corresponding image; and keep, in response to determining that the gaze duration is greater than the preset threshold, the at least one first image sensor in a working state, and display an image output by the at least one first sensor as the environment image in a full-screen mode.

In a possible implementation mode, the driving circuit is further configured to:

stitch, in response to determining that a total number of image sensors in the working state of the image sensor array is greater than 1, a plurality of images output by the image sensor array into a stitched image; and generate the environment image by adjusting brightness and color of the stitched image.

In a possible implementation mode, the driving circuit is further configured to: select an image from the plurality of images as a reference image, and stitch two adjacent images from the reference image until the plurality of images output by the image sensor array are stitched, where two adjacent images are stitched by:

acquiring a plurality of matching points having the same image feature from the two adjacent images;

calculating translation matrixes, rotation matrixes, and intrinsic parameter matrixes corresponding to the plurality of matching points respectively;

calculating a homography matrix of each matching point according to the translation matrix, the rotation matrix, and the intrinsic parameter matrix of each matching point;

calculating each homography matrix through a least median robustness method, selecting matching points corresponding to homography matrixes satisfying a preset quality requirement to form an optimal sub-set, calculating a final homography matrix according to the optimal sub-set, and converting the two adjacent images into images having a same angle of view;

performing coordinate alignment on pixels in the images having the same angle of view, and averaging overlapping pixels to obtain a stitched sub-image of the two adjacent images; and repeatedly executing the stitching the two adjacent images on all stitched sub-images to obtain the stitched image.

In a possible implementation mode, the driving circuit is further configured to:

determine a blurred region in the stitched image according to a change in an optical flow field in the stitched image;

obtain a filtered image by performing bilateral filtering on the blurred region;

perform illumination correction on the filtered image through a preset illumination model; and obtain the environment image by fusing overlapping regions of two adjacent images corresponding to the blurred region according to a weight.

In a possible implementation mode, the driving circuit is further configured to:

determine a position of a preset object in the environment image when the mixed display signal is a dynamic mixed display signal;

move a virtual image of a virtual object in a current frame to the position, and adjust an angle and a size of the virtual image; and obtain the MR image by adjusting illumination and a shadow effect of the virtual image according to illumination detected in a real environment, and transmit the MR image to the display screen for display.

In a possible implementation mode, the driving circuit is further configured to:

extract a plurality of feature points from the environment image;

match the plurality of feature points with feature points of the preset object; and determine a position of a successfully-matched feature point in the environment image as the position of the preset object in the environment image.

In a possible implementation mode, the driving circuit is further configured to: obtain and display the MR image by superimpose and render a static virtual image on the environment image when the mixed display signal is a static mixed display signal.

In a possible implementation mode, the driving circuit is further configured to: turn off the image sensor array, and display an image of a virtual world when the MR apparatus receives a virtual display signal.

In a possible implementation mode, the driving circuit is further configured to: display the environment image when a live display signal is received.

In a third aspect, an embodiment of the present disclosure further provides a mixed reality apparatus. The mixed reality apparatus includes: at least one processor, and a memory connected to the at least one processor, where the memory stores instructions executable by the at least one processor, and the at least one processor executes the instructions stored in the memory to perform the method in the first aspect described above.

In a fourth aspect, an embodiment of the present disclosure further provides a readable storage medium. The readable storage medium includes: a memory, where the memory is configured to store instructions, and the instructions cause an apparatus including the readable storage medium to complete the method in the first aspect described above when executed by a processor.

DETAILED DESCRIPTION OF THE EMBODIMENTS

Embodiments of the present disclosure provide a method for displaying a mixed reality, a mixed reality apparatus, and a storage medium, so as to solve the technical problems that a field of view is narrow and a depth of field of an image is far from exquisite of mixed reality display in the related art.

In order to have a better understanding of the technical solutions described above, the technical solutions of the present disclosure are described in detail below with reference to the accompanying drawings and the specific embodiments. It should be understood that the embodiments of the present disclosure and specific features in the embodiments are detailed descriptions rather than limitations of the technical solutions of the present disclosure. The embodiments of the present disclosure and the technical features in the embodiments can be mutually combined without conflict.

Figure 1:
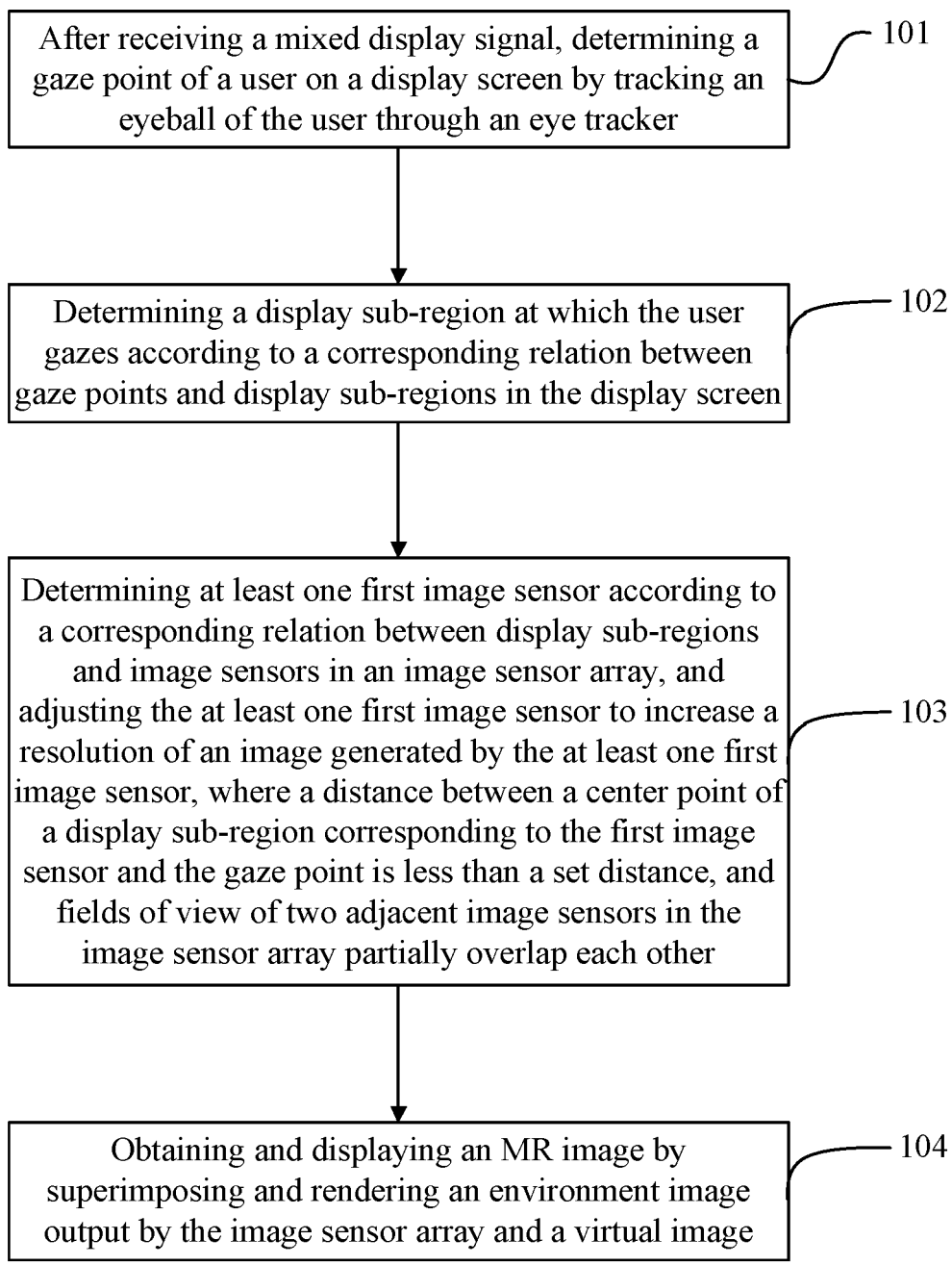
FIG. 1 is a flowchart of a method for displaying a mixed reality according to an embodiment of the present disclosure.
Figure 2:
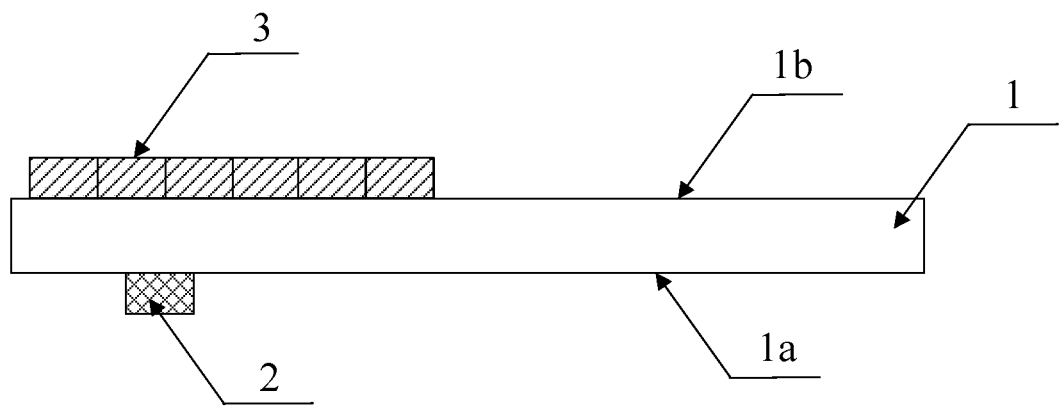
FIG. 2 is a first schematic structural diagram of a mixed reality apparatus according to an embodiment of the present disclosure.

FIG. 1 is a flowchart of a method for displaying a mixed reality according to an embodiment of the present disclosure. FIG. 2 is a first schematic structural diagram of a mixed reality apparatus according to an embodiment of the present disclosure. With reference to FIGS. 1 and 2, the mixed reality (MR) apparatus includes: a display screen 1, an eye tracker 2 on a display surface 1a of the display screen, and an image sensor array 3 on a non-display surface 1b of the display screen, where image sensors in the image sensor array 3 are in a corresponding relation with a plurality of display sub-regions in the display screen 1.

The image sensors in the image sensor array 3 may be a wide-angle camera, a telephoto camera, a color camera, a black-and-white camera, a depth camera, etc. The image sensors may be arranged in various manners, such as in one row, or in an array including a plurality of rows and a plurality of columns, or in two small arrays positioned at two ends of the non-display surface 1b of the display screen, respectively. The array may be square, matrixed, circular, etc., which will not be limited herein. Fields of view of two adjacent image sensors in the image sensor array 3 partially overlap each other.

The eye tracker 2 may be an image sensor or an infrared sensor, which will not be specifically limited.

It is to be noted that FIG. 2 should be interpreted as showing an MR apparatus for a single eye. If it is an MR apparatus for both eyes, the image sensor arrays 3 and the eye trackers 2 should be each symmetrically distributed on the display screen 1. If each eye corresponds to one eye tracker 2, the two eye trackers are symmetrically distributed on the display surface 1a of the display screen. If there is only one eye tracker 2, the eye tracker should be positioned in the middle of the display surface 1a of the display screen, and the image sensors in the image sensor array 3 should be symmetrically distributed on the non-display surface 1b of the display screen. The number of the image sensors in the image sensor array 3 in FIG. 2 does not denote the number in actual use. A mounting position of the image sensor array 3 on the non-display surface 1b of the display screen and a mounting position of the eye tracker 2 on a front surface 1a of the display screen are not limited to positions shown in FIG. 2, which may be adjusted as required in actual use.

The method for displaying a mixed reality used in the MR apparatus includes a processing process as follows.

S101: an eyeball of a user is tracked through the eye tracker, to determine a gaze point of the user on the display screen after a mixed display signal is received.

The MR apparatus may include a plurality of display modes, such as a virtual display mode (that is, only an image of a virtual world is displayed), a live display mode (that is, only an image of a real world is displayed), and a mixed display mode (that is, an image of a real world and an image of a virtual world are displayed simultaneously). The display mode of the MR apparatus is set according to a received signal. For example, when the mixed display signal is received, the MR apparatus is set to the mixed display mode.

The eyeball of the user may be tracked through the eye tracker, to determine the gaze point of the user on the display screen after the mixed display signal is received.

Figure 3:
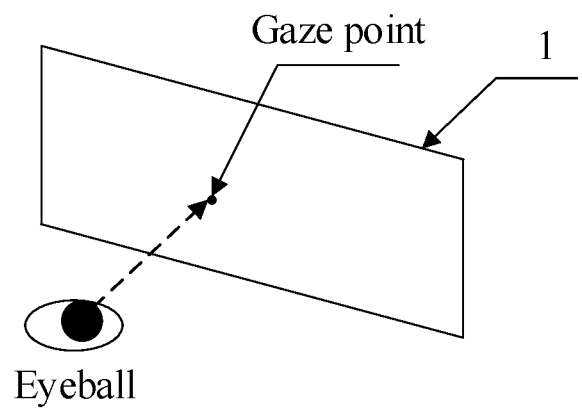
FIG. 3 is a schematic diagram of determining a gaze point according to an embodiment of the present disclosure.

FIG. 3 is a schematic diagram of determining a gaze point according to an embodiment of the present disclosure. For example, with reference to FIG. 3 (the eye tracker is not shown in FIG. 3), the eye tracker may track the eyeball of the user through OpenCV (a cross-platform computer vision and machine learning software library). That is, a gaze direction of the user is calculated by capturing an infrared reflection of an eye of the user, and defined as an observation vector (shown as a dotted arrow direction in FIG. 3). An intersection between the observation vector and the display screen 1 is the gaze point of the user on the display screen 1. Moreover, a gaze duration (recorded as t) for which the eyeball remains at the same gaze point may also be recorded. When t is greater than 5 s, a time parameter T is recorded equal to 1, otherwise T is 0.

After the gaze point of the user on the display screen is determined, S102 may be executed.

S102: a display sub-region at which the user gazes is determined according to a corresponding relation between gaze points and display sub-regions in the display screen.

In the present disclosure, a display sub-region of the gaze point may be determined as the display sub-region at which the user gazes. Alternatively, a distance between a center point of the display sub-region and the gaze point may be calculated, and a display sub-region with a distance less than a set distance is determined as the display sub-region at which the user gazes.

Figure 4:
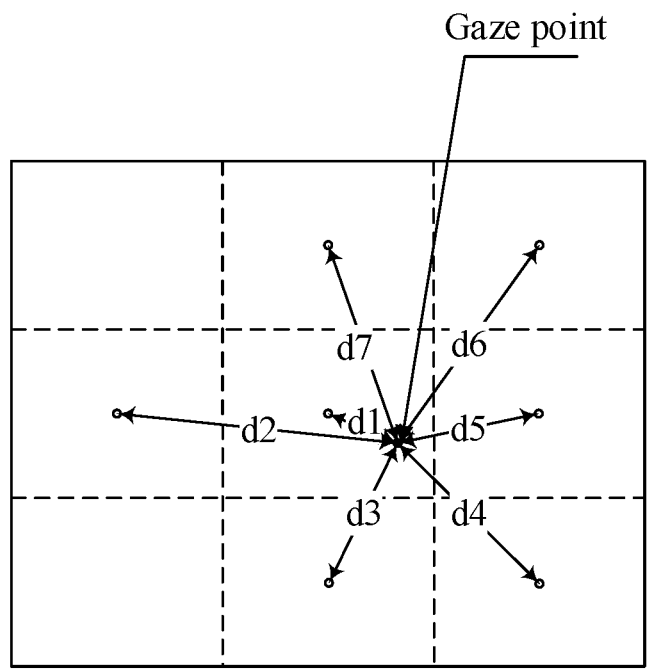
FIG. 4 is a schematic diagram of determining a display sub-region at which a user gazes according to an embodiment of the present disclosure.

With reference to FIG. 4, a schematic diagram of determining a display sub-region at which the user gazes according to an embodiment of the present disclosure is shown.

In FIG. 4, a black dot indicates the gaze point, a hollow circle denotes the center point of the display sub-region, and a dot dash line denotes a division line of the display sub-region. Assuming that the set distance is d, it is determined that d1, d3, d4, and d5 are less than d by comparing d with d1-d7. Accordingly, display sub-regions corresponding to d1, d3, d4, and d5 are determined as the display sub-regions at which the user gazes.

After the display sub-region at which the user gazes is determined, S103 may be executed.

Step 103: at least one first image sensor is determined according to the corresponding relation between display sub-regions and image sensors in the image sensor array, and at least one first image sensor is adjusted to increase a resolution of an image generated by at least one first image sensor. A distance between a center point of a display sub-region corresponding to the first image sensor and the gaze point is less than the set distance, and fields of view of two adjacent image sensors in the image sensor array partially overlap each other.

The first image sensor corresponding to the display sub-region at which the user gazes is determined according to the corresponding relation between display sub-regions and image sensors in the image sensor array as follows.

If the image sensors in the image sensor array are in a one-to-one corresponding relation with the plurality of display sub-regions in the display screen, an image sensor corresponding to the display sub-region at which the user gazes determined in S102 is determined as the first image sensor. With FIG. 4 as an example, the display sub-regions at which the user gazes are determined as the display sub-regions corresponding to d1, d3, d4, and d5, and four image sensors corresponding to the display sub-regions corresponding to d1, d3, d4, and d5 are taken as four first image sensors.

If the image sensors in the image sensor array are in a one-to-many corresponding relation with the plurality of display sub-regions in the display screen, that is, one image sensor corresponds to at least two display sub-regions. An image sensor corresponding to the display sub-region at which the user gazes determined in S102 may also be determined as the first image sensor.

While the first image sensor corresponding to the display sub-region at which the user gazes is determined, at least one first image sensor may also be adjusted as follows.

Whether a gaze duration for which the gaze point remains in the display sub-region corresponding to at least one first image sensor is greater than a preset threshold is determined; in response to determining that the gaze duration is less than or equal to the preset threshold, the resolution of the image generated by at least one first image sensor is increased, so as to increase a resolution of a corresponding image; and in response to determining that the gaze duration is greater than the preset threshold, at least one first image sensor is kept in a working state, and an image output by at least one first sensor is displayed as an environment image in a full-screen mode.

Figure 5:
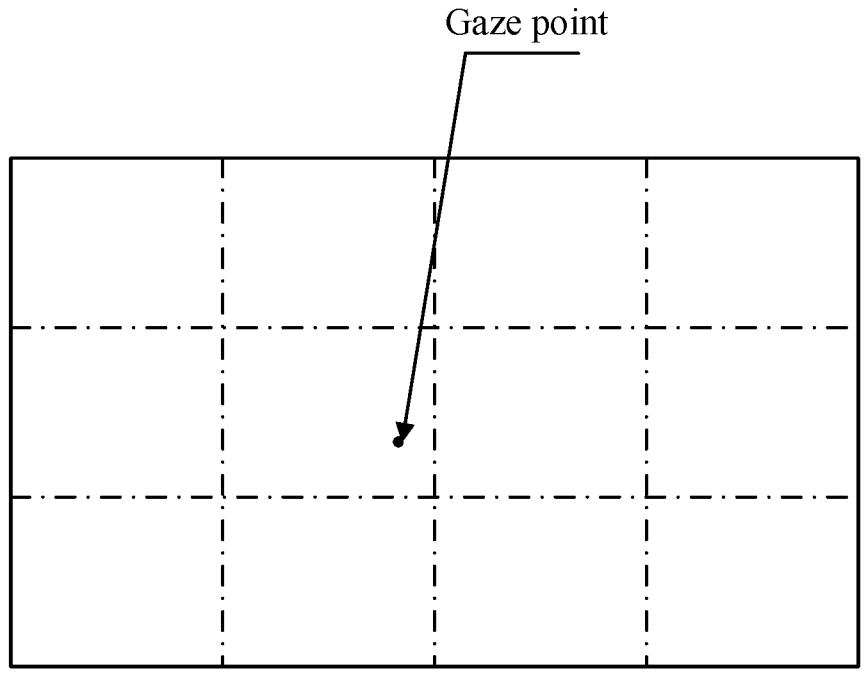
FIG. 5 is a schematic diagram of dividing display regions of a display screen according to an embodiment of the present disclosure.

For example, with reference to FIG. 5, a schematic diagram of dividing display regions of a display screen according to an embodiment of the present disclosure is shown. Assuming that the image sensor array 3 is composed of 3×4 image sensors, a display region of the display screen 1 is divided into 3×4 display sub-regions (the dot dash lines are division lines of the display sub-regions), and the 3×4 display sub-regions correspond one-to-one to the 3×4 image sensors. The gaze point determined through the eye tracker is shown as a black dot in FIG. 5, and positioned in a display sub-region in row 2 and column 2 in the display screen.

If the display sub-region of the gaze point is determined as the display sub-region at which the user gazes, the display sub-region in row 2 and column 2 in the display screen is the display sub-region at which the user gazes. Correspondingly, the display sub-region corresponds to an image sensor in row 2 and column 2 in the image sensor array 3. Therefore, the image sensor in row 2 and column 2 in the image sensor array 3 is determined as the first image sensor.

If the display sub-region with the distance between the gaze point and the center point of the display sub-region less than the set distance is taken as the display sub-region at which the user gazes, assuming that display sub-regions in row 1 and column 2 and in row 2 and column 2 in the display screen are determined as the display sub-regions at which the user gazes, image sensors in row 1 and column 2 and in row 2 and column 2 in the image sensor array 3 corresponding to the above display sub-regions are determined as the first image sensors.

Figure 6:
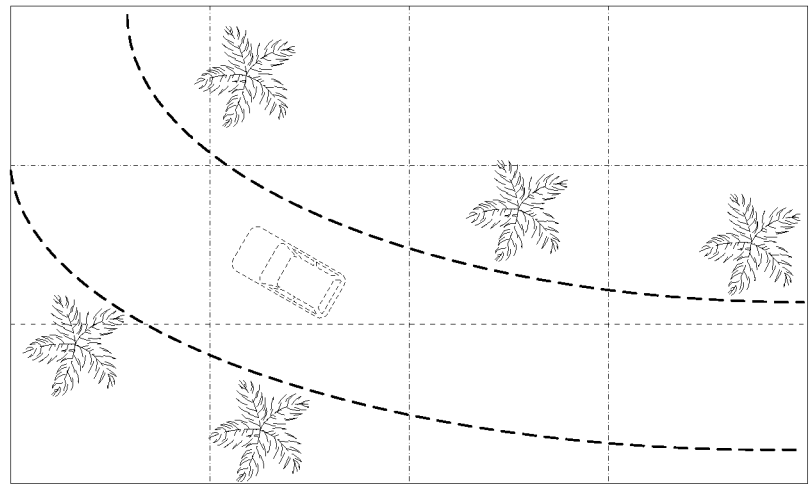
FIG. 6 is a schematic diagram of an environment image at an initial moment according to an embodiment of the present disclosure.
Figure 7:
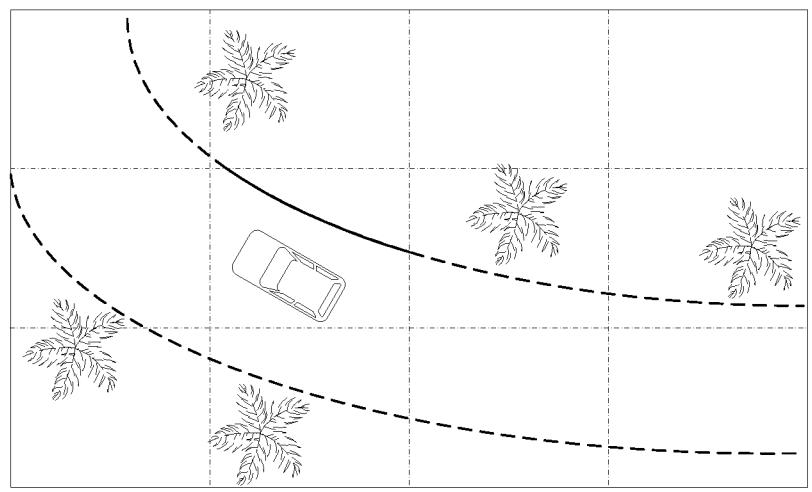
FIG. 7 is a schematic diagram of an environment image when gaze duration is less than a preset threshold according to an embodiment of the present disclosure.
Figure 8:
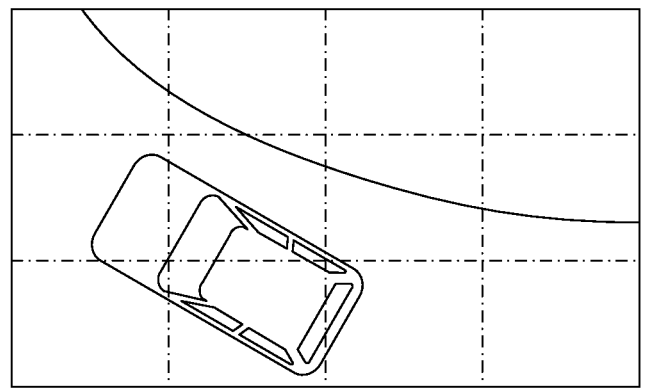
FIG. 8 is a schematic diagram of an environment image when gaze duration is greater than a preset threshold according to an embodiment of the present disclosure.

With reference to FIGS. 6-8, FIG. 6 is a schematic diagram of an environment image at an initial moment according to an embodiment of the present disclosure; FIG. 7 is a schematic diagram of an environment image when gaze duration less than the preset threshold according to an embodiment of the present disclosure; and FIG. 8 is a schematic diagram of an environment image when gaze duration greater than the preset threshold according to an embodiment of the present disclosure. It is assumed that in FIGS. 6-7, gaze points are positioned in the display sub-region in row 2 and column 2 in the display screen.

At the initial moment, the environment image displayed in the display screen is as shown in FIG. 6. It is assumed that a gaze duration for which the gaze point remains in the display sub-region (that is, the display sub-region in row 2 and column 2 in the display screen) corresponding to the first image sensor is 3 s. Given that the preset threshold is 5 s, in this case, the gaze duration is less than the preset threshold, a resolution of the first image sensor (the image sensor corresponding to the display sub-region in row 2 and column 2) is increased. Therefore, a portion, corresponding to the first image sensor, of the environment image is displayed in high definition, and the environment image displayed in the display screen in this case is as shown in FIG. 7.

It is assumed that the gaze duration for which the gaze point remains in the display sub-region corresponding to the first image sensor is 6 s. Therefore, the gaze duration is greater than the preset threshold. In this case, only the first image sensor is kept in the working state, and the image output by the first image sensor is displayed as the environment image in a full-screen mode. The environment image displayed in the display screen in this case is as shown in FIG. 8.

It is to be noted that if a plurality of display sub-regions at which the user gazes are provided, a similar operation is executed on first image sensors corresponding to these display sub-regions. The difference lies in that images output by these first image sensors are displayed after being stitched during display, which will not be repeated herein for the sake of brevity. In FIGS. 6-8, the division lines of each sub-region in the display screen are shown by dashed lines for convenience of observation, which will not be displayed in practical applications. High-resolution portions and low-resolution portions in the images in FIGS. 6-8 are illustrated by solid lines and dashed lines, respectively. The environment image in FIGS. 6-8 is an image obtained by stitching and fusing a plurality of images output by the image sensor array, a specific processing method of which is described in S103.

After the first image sensor is adjusted, S104 may be executed.

S104: the environment image output by the image sensor array and a virtual image are superimposed and rendered to obtain and display an MR image.

Before the environment image output by the image sensor array and a virtual image are superimposed and rendered, the method further includes: in response to determining that the total number of the image sensors in the working state of the image sensor array is greater than 1, a plurality of images output by the image sensor array are stitched into a stitched image; and brightness and color of the stitched image are adjusted to generate the environment image.

The plurality of images output by the image sensor array are stitched into a stitched image through an image stitching algorithm in real time, so that a plurality of images output by the image sensor array at the same moment may be stitched in real time to obtain one stitched image. Since the fields of view of two adjacent image sensors in the image sensor array overlap each other, the plurality of images are stitched in real time through the image stitching algorithm, so that a picture does not seem to be divided.

The plurality of images output by the image sensor array are stitched into a stitched image as follows: an image is selected from the plurality of images as a reference image, and two adjacent images are stitched from the reference image until the plurality of images output by the image sensor array are stitched.

In order to implement a real-time image stitching algorithm, the image sensors in the image sensor array are required to be calibrated before photographing, for example, mounting position are corrected, and photographing parameters are set. In this way, images photographed by all the image sensors have better consistency, which is conducive to subsequent image stitching. During stitching, if the image sensor array outputs the images photographed by all the image sensors at the same time, an image photographed by an image sensor positioned in the image sensor array and corresponding to a central position of the display screen may be taken as the reference image. If the image sensor array outputs images photographed by some image sensors, an image photographed by the first image sensor corresponding to a sub-pixel region of the gaze point may be taken as the reference image. Two adjacent images are stitched from the reference image in a stitching process until the plurality of images output by the image sensor array are stitched.

Two adjacent images are stitched as follows: a plurality of matching points having the same image feature are acquired from two adjacent images; translation matrixes, rotation matrixes, and intrinsic parameter matrixes corresponding to the plurality of matching points are calculated respectively; a homography matrix of each matching point is calculated according to the translation matrix, the rotation matrix, and the intrinsic parameter matrix of each matching point; each homography matrix is calculated through a least median robustness method, matching points corresponding to homography matrixes satisfying a preset quality requirement are selected to form an optimal sub-set, a final homography matrix is calculated according to the optimal sub-set, and two adjacent images are converted into images having the same angle of view; and coordinate alignment is performed on pixels in the images having the same angle of view, and overlapping pixels are averaged to obtain a stitched sub-image of two adjacent images.

Figure 9:
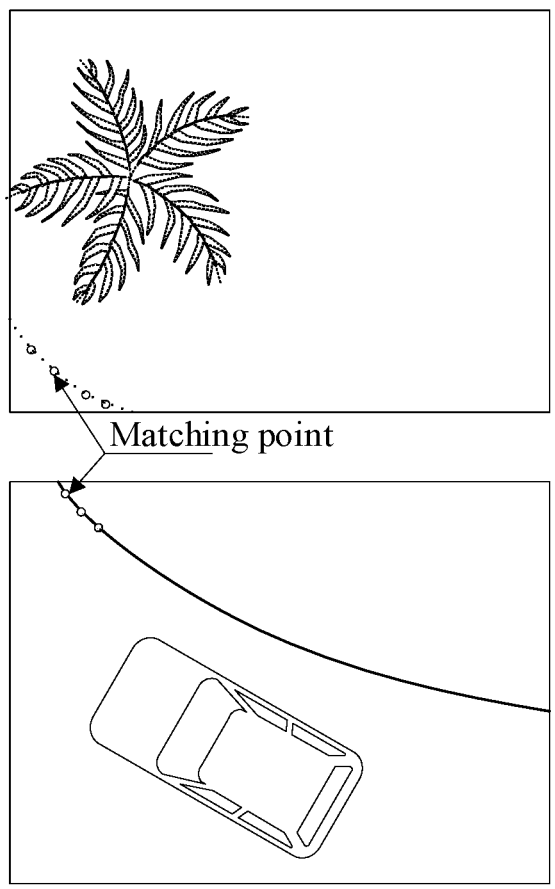
FIG. 9 is a schematic diagram of acquiring a plurality of matching points having the same image feature from two adjacent images according to an embodiment of the present disclosure.

With reference to FIG. 9, a schematic diagram of acquiring a plurality of matching points having the same image feature from two adjacent images according to an embodiment of the present disclosure is shown. In FIG. 9, a small portion of a road on which a vehicle travels is common to the two images. Feature points in the two images are detected and matched with one another, so that a plurality of matching points (feature points on a boundary line of a travelling road in FIG. 9 are taken as an example, illustrated by circles with oblique lines) to which the portion common to the two images travels may be obtained. Respective translation matrixes, rotation matrixes, and intrinsic parameter matrixes corresponding to these matching points are calculated. A homography matrix of each matching point is calculated according to the translation matrix, the rotation matrix, and the intrinsic parameter matrix of each matching point. Each homography matrix is calculated through a least median robustness method, matching points corresponding to homography matrixes satisfying a preset quality requirement are selected to form an optimal sub-set, a final homography matrix is calculated according to the optimal sub-set, and two adjacent images are converted into images having the same angle of view. Coordinate alignment is performed on pixels in the images having the same angle of view, and overlapping pixels are averaged to obtain a stitched sub-image of two adjacent images.

The processing process described above involves processing processes of transforming image coordinates into world coordinates and image fusion. According to image coordinate transformation, matching and filtering may be performed according to image feature points having fixed characteristics such as illumination and orientation in the plurality of images. A resolution of an image (an image collected by an ith image sensor in the image sensor array is denoted as $P_i$) collected by each image sensor may be calculated. A focal length (denoted as $d_i$) from an optical center of the ith image sensor to an imaging plane may be recorded. Then each image is transformed from a camera coordinate system to a world coordinate system. Finally, a homography matrix of each image is calculated, so that all the images have the same angle of view under the same coordinate system, thereby completing image stitching.

The image is translated and rotated, so as to be transformed from the camera coordinate system to the world coordinate system principally through a translation matrix $T_i$ and a rotation matrix $R_i$. Then a projection transformation matrix $Q_i = T_i \cdot F_i \cdot R_i$ of the image $P_i$ is calculated through $T_i$, $R_i$, and $d_i$. Translation and rotation transformation performed when the $P_i$ is projected from the camera coordinate system to the world coordinate system are described through $Q_i$.

$$F_i = \begin{bmatrix} d_i & 0 & 0 \\ 0 & d_i & 0 \\ 0 & 0 & 1 \end{bmatrix}.$$

Then a homography matrix $H_i = \text{inv}(Q_i) \cdot Q_r$ of $P_i$ is calculated through $Q_i$ to denote a coordinate corresponding relation between all pixel points when $P_i$ and $P_r$ undergo image matching, where $\text{inv}(Q_i)$ denotes an inverse matrix of the matrix $Q_i$. After homography transformation, all the images are converted into images $U_i$ having the same angle of view. Then coordinates of each pixel point in $U_i$ are converted into homogeneous coordinates. In this way, the pixel points of all the images are moved to the same coordinate system, so as to form a complete image. Then values of the pixel points in the overlapping portions are averaged to obtain the stitched sub-image.

Figure 10:
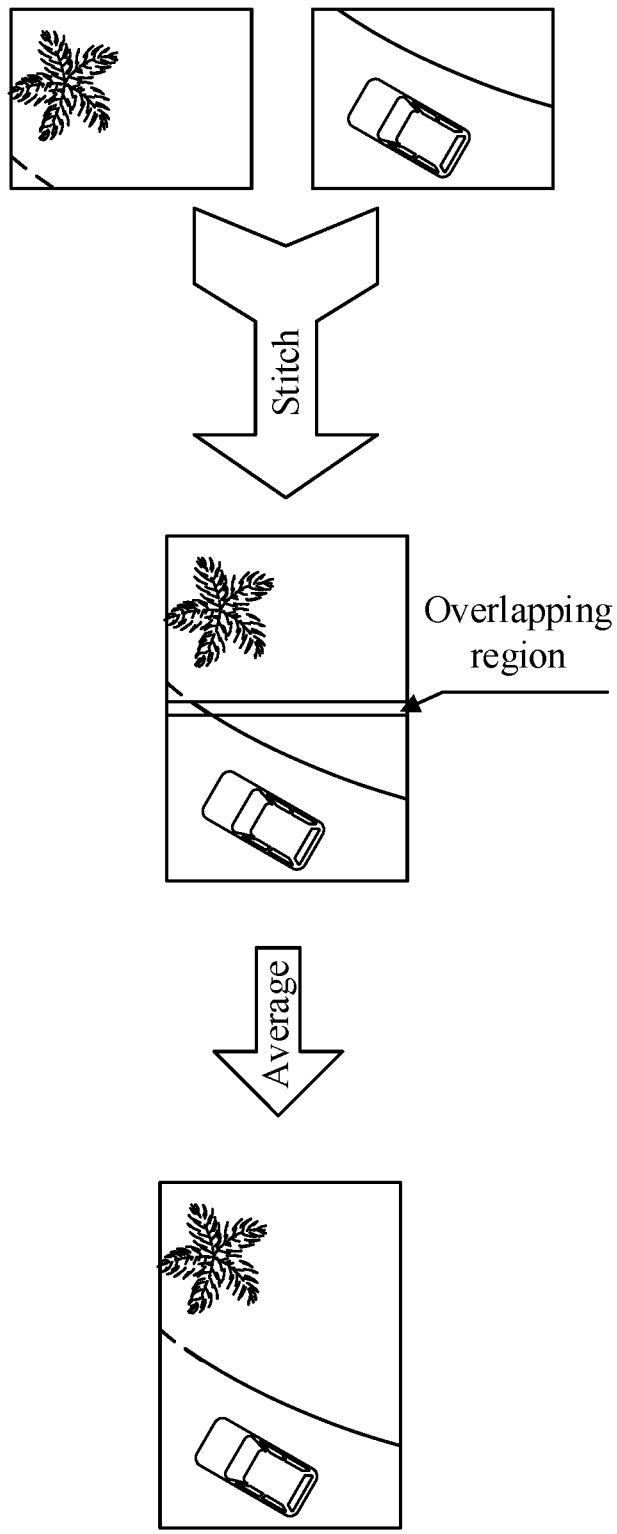
FIG. 10 is a schematic diagram of image stitching according to an embodiment of the present disclosure.

For example, the two images in FIG. 9 are transformed to the same coordinate system and the same angle of view for stitching, and the overlapping regions are averaged to obtain a partially-stitched image as shown at the end of FIG. 10. FIG. 10 is a schematic diagram of image stitching according to an embodiment of the present disclosure.

A stitching process of the two adjacent images described above is repeatedly executed on all stitched sub-images to obtain the stitched image.

When the images are stitched, two adjacent images are used, the two adjacent images have different fields of view, and parts of the fields of view overlap each other. Therefore, change matrixes (that is, the translation matrix, the rotation matrix, etc.) and camera intrinsic parameters (that is, the intrinsic parameter matrix) are calculated through two fields of view in the stitching process, thereby realizing a rapid processing speed. Moreover, in the processing process, the optimal sub-set is selected through the least median robustness method, to calculate an estimated initialization value and a mask of the homography matrix, thereby further reducing a re-projection error, and reducing a noise.

There are some blurred regions (for example, an outline of an object is insufficiently clear, exposure is non-uniform, etc.) in the stitched image. Accordingly, these blurred regions are required to be processed, so as to make an entire stitched image consistent in overall chromaticity and brightness, thereby obtaining the environment image.

In a possible implementation mode, the brightness and color of the stitched image are adjusted to generate the environment image as follows: a blurred region in the stitched image is determined according to a change in an optical flow field in the stitched image; bilateral filtering is performed on the blurred region to obtain a filtered image; illumination correction is performed on the filtered image through a preset illumination model; and overlapping regions of two adjacent images corresponding to the blurred region are fused according to a weight to obtain the environment image.

For example, an optical flow in a horizontal direction in the stitched image may be approximated as a reciprocal (disparity) of a depth. The normalized sum of squared errors is obtained through retrieval and calculation for the vicinity of the blurred region in the stitched image. An initial optical flow is calculated according to a block optical flow and its confidence coefficient map, and spatially continuous with a surrounding optical flow through bilateral filtering processing. Finally, the optical flow field with a clear boundary is obtained, and exposure is also uniform and smooth. Then illumination non-uniformity inside the filtered image is corrected through the illumination model of a camera. A histogram mapping table between two adjacent images is constructed through a relation corresponding to the overlapping regions of two adjacent images in the stitched image. The overlapping regions of two adjacent images corresponding to the blurred region are fused according to a weight (that is, overall mapping transformation is performed) through the mapping table. Finally, the environment image having the consistent overall brightness and color is obtained.

It is assumed that two images corresponding to a certain blurred region in the filtered image are image 1 and image 2, p and t denote base addresses of pixels in ith rows of stitched image 1 and stitched image 2, respectively, d denotes an address of a first pixel in an ith row of the filtered image, row denotes the row number of d, 0≤i<row, col denotes the column number of p, 0≤j<col, alpha denotes a pixel weight coefficient of image 1, start denotes a starting position of the overlapping region, and width denotes a width of the overlapping region. When there is a black dot without a pixel in t, alpha=1, d copies data in p completely, otherwise alpha=(width−(j−start))/width. Fusion formulas are as follows:

$$d[j\times 3]=p[j*3]\times \text{alpha}+t[j\times 3]*(1-\text{alpha});$$

$$d[j\times 3+1]=p[j\times 3+1]\times \text{alpha}+t[j\times 3+1]\times(1-\text{alpha}); \text{ and}$$

$$d[j\times 3+2]=p[j\times 3+2]\times \text{alpha}+t[j\times 3+2]\times(1-\text{alpha}).$$

Through the above operation, pixels in the overlapping regions may be fused to obtain the environment image.

After images in a real environment, which are photographed through the image sensor array in the embodiment of the present disclosure, are stitched and fused, the obtained image has a wider field of view, exceeding the limit of human eyes. Accordingly, the user may see a more distant and exquisite scene and have the field of view completely exceeding a field of view of an existing MR apparatus, thereby significantly improving the immersion experience of the user.

After the environment image is obtained, the environment image output by the image sensor array and a virtual image are required to be superimposed and rendered to obtain and display an MR image as follows: a position of a preset object in the environment image is determined when the mixed display signal is a dynamic mixed display signal; a virtual image of a virtual object in a current frame is moved to the position of the preset object in the environment image, and an angle and a size of the virtual image are adjusted; and illumination and a shadow effect of the virtual image are adjusted according to illumination detected in the real environment to obtain the MR image, and the MR image is transmitted to the display screen for display.

In a possible implementation mode, the position of the preset object in the environment image may be determined as follows: a plurality of feature points are extracted from the environment image; the plurality of feature points are matched with feature points of the preset object; and a position of a successfully-matched feature point in the environment image is determined as the position of the preset object in the environment image.

Figure 11:
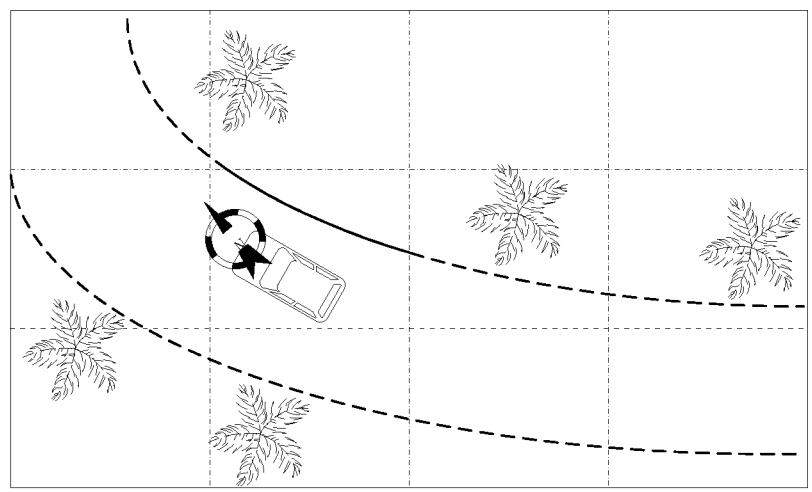
FIG. 11 is a schematic diagram of moving a virtual object to a position of a preset object in an environment image according to an embodiment of the present disclosure.

For example, in FIG. 7, the preset object is a head portion of the vehicle, and the virtual object is a compass. The plurality of feature points are extracted from the environment image, which are typically fixed, such as corner points of a vehicle body, a license plate, and corner points of a vehicle lamp. A plurality of feature points representing the head portion of the vehicle may be pre-stored and matched with the plurality of feature points acquired from the environment image. A position of the head portion of the vehicle in the environment image may be determined after matching is successful. Further, the virtual image of the virtual object in the current frame is moved to the position of the preset object in the environment image, and the angle and size of the virtual image are adjusted, as shown in FIG. 11, which is a schematic diagram of moving a virtual object to a position of a preset object in an environment image according to an embodiment of the present disclosure.

After the dynamic mixed display signal is received, a scene where the user is positioned currently is identified through foreground information (the environment image) transmitted through the image sensor on the basis of an algorithm. Then different dynamic virtual pictures are intelligently rendered according to the scene. If the user is identified to be in a market block, a dynamic scene where a virtual dinosaur flies over may be rendered. In this way, a picture stronger in space sense, wider in visual field, and exquisite in picture quality may be presented overall.

In addition, related algorithms (such as the image stitching algorithm, a rendering algorithm, etc.) of the image processing described above may also be integrated into a driving circuit of the display screen. In this way, the image processing speed may be accelerated, and a rendering effect may be enhanced, so that the user has a more realistic visual experience.

In a possible implementation mode, the step that the environment image output by the image sensor array and a virtual image are superimposed and rendered to obtain and display an MR image includes: a static virtual image is superimposed and rendered on the environment image to obtain and display the MR image when the mixed display signal is a static mixed display signal.

For example, when a circuit engineer welds a circuit, a welding point (the welding point serves as the gaze point of the user) may be enlarged through the image sensor array, and a virtual schematic circuit diagram may be superimposed on an environment image formed by welding points simultaneously to form a static MR image, so as to be displayed on the display screen. In this way, the user may conveniently modify the circuit by directly watching the display screen.

In a possible implementation mode, when a virtual display signal is received, the image sensor array is turned off, and an image of the virtual world is displayed.

In a possible implementation mode, the environment image is displayed when a live display signal is received.

Figure 12:
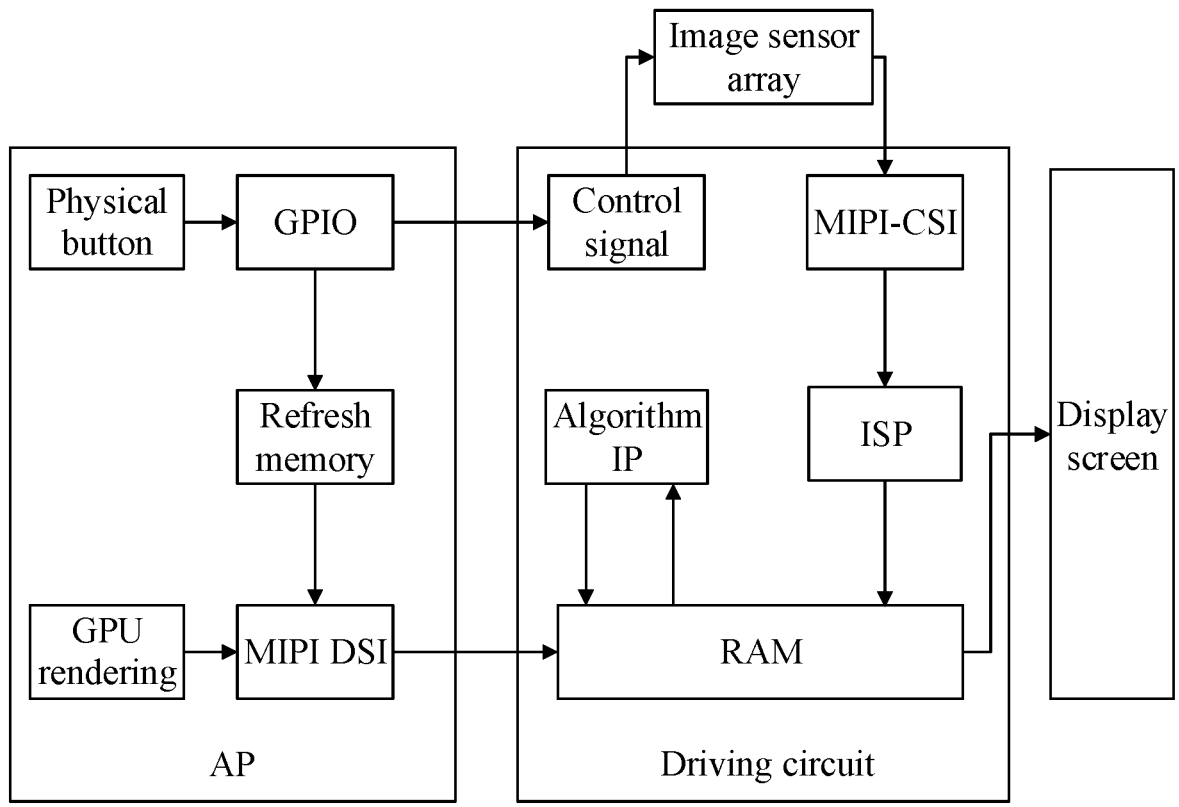
FIG. 12 is a second schematic structural diagram of a mixed reality apparatus according to an embodiment of the present disclosure.

In order to make it convenient for the MR apparatus to rapidly switch between the plurality of display modes described above, and to maintain a high-speed processing effect, an image of a rendered virtual world may be processed in an application processor (AP). Image signal processing (ISP) for processing the image output by the image sensor array may be integrated into the driving circuit of the display screen. The switch between different display modes may be implemented through a physical button arranged in the AP in a one-key switch manner. With reference to FIG. 12, a second schematic structural diagram of a mixed reality apparatus according to an embodiment of the present disclosure is shown.

The AP in FIG. 12 includes the physical button, a general-purpose input/output (GPIO) interface, a refresh register, a mobile industry processor interface (MIPI) display bus interface (DSI) (a serial interface applied to a display technology), and a graphics processing unit (GPU). The GPU renders an image for rendering and generating the virtual world, and the image is transmitted to a random access memory (RAM) in a driver through the MIPI DSI. The physical button transmits control information input by the user to the refresh register and the driving circuit through the GPIO interface. If the control information indicates that the virtual display mode is to be used, after the control information is transmitted to the driving circuit, the driving circuit generates a corresponding control signal to control the image sensor array to be turned off; otherwise, the image sensor array is turned on. If the control information indicates that the live display mode is used, after the control information is transmitted to the refresh register, the MIPIDSI stops outputting the image of the virtual world rendered by the GPU to the RAM in the driving circuit. In this way, the user may independently select whether to experience a mixed display world or a pure virtual world through the physical button.

The driving circuit in FIG. 12 may generate the control signal for controlling the image sensors in the image sensor array to be turned off or on, and include a MIPI camera serial interface (CSI) for receiving image signals output by the image sensor array, and the ISP for processing the image signals received through the MIPI CSI. The ISP sends processed signals to the RAM, and an algorithm intellectual property (IP) processes data in the RAM.

It is to be noted that those skilled in the art may also make variations to components of the apparatus according to contents shown in FIG. 12. For example, the modifications and variations may include integrating the AP portion into the driving circuit together, or integrating the physical button and the GPIO into the driving circuit together, which do not depart from the spirit and scope of the present disclosure.

Figure 13:
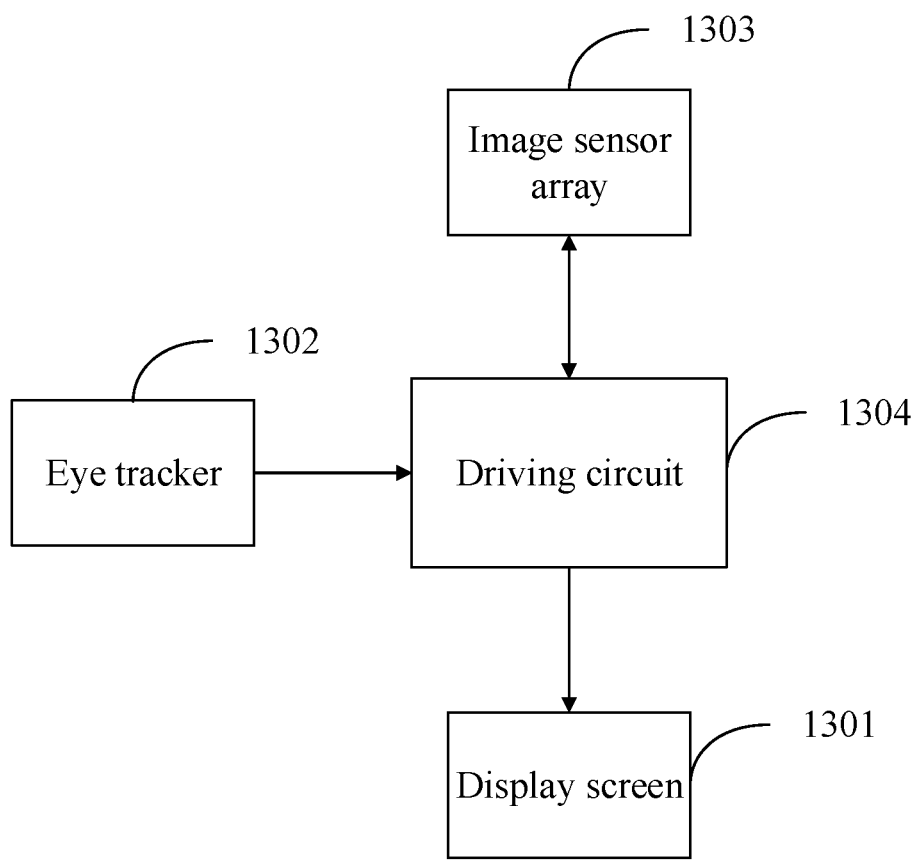
FIG. 13 is a third schematic structural diagram of a mixed reality apparatus according to an embodiment of the present disclosure.

Based on the same inventive concept, an embodiment of the present disclosure provides a mixed reality apparatus. Reference may be made to the description of the method embodiment for a specific implementation mode of the method for displaying a mixed reality for the mixed reality apparatus, the repetitions will not be repeated herein. With reference to FIG. 13, the mixed reality apparatus includes: a display screen 1301; an eye tracker 1302 on a display surface of the display screen 1301; an image sensor array 1303 on a non-display surface of the display screen 1301, where image sensors in the image sensor array are in a corresponding relation with a plurality of display sub-regions in the display screen; and a driving circuit 1304 configured to control the eye tracker 1302 to track an eyeball of a user, so as to determine a gaze point of the user on the display screen 1301 after a mixed display signal is received; determine, according to a corresponding relation between gaze points and display sub-regions in the display screen and the corresponding relation between the display sub-regions and the image sensors in the image sensor array, at least one first image sensor corresponding to the gaze point; adjust the at least one first image sensor, so as to increase a resolution of an image generated by the at least one first image sensor, where a distance between a center point of a display sub-region corresponding to the first image sensor and the gaze point is less than a set distance, and fields of view of two adjacent image sensors in the image sensor array partially overlap each other; and superimpose and render an environment image output by the image sensor array 1303 and a virtual image to obtain and display an MR image.

In a possible implementation mode, the driving circuit 1304 is further configured to: determine whether a gaze duration for which the gaze point remains in a display sub-region corresponding to the at least one first image sensor is greater than a preset threshold; increase, in response to determining that the gaze duration is less than or equal to the preset threshold, the resolution of the image generated by the at least one first image sensor, so as to increase a resolution of a corresponding image; and keep, in response to determining that the gaze duration is greater than the preset threshold, the at least one first image sensor in a working state, and display an image output by the at least one first sensor as the environment image in a full-screen mode.

In a possible implementation mode, the driving circuit 1304 is further configured to: stitch, in response to determining that the total number of image sensors in a working state of the image sensor array is greater than 1, a plurality of images output by the image sensor array 1303 into a stitched image; and generate the environment image by adjusting brightness and color of the stitched image.

In a possible implementation mode, the driving circuit is further configured to: select an image from the plurality of images as a reference image, and stitch two adjacent images from the reference image until the plurality of images output by the image sensor array are stitched, where two adjacent images are stitched as follows: acquire a plurality of matching points having the same image feature from the two adjacent images; calculate translation matrixes, rotation matrixes, and intrinsic parameter matrixes corresponding to the plurality of matching points respectively; calculate a homography matrix of each matching point according to the translation matrix, the rotation matrix, and the intrinsic parameter matrix of each matching point; calculate each homography matrix through a least median robustness method, select matching points corresponding to homography matrixes satisfying a preset quality requirement to form an optimal sub-set, calculate a final homography matrix according to the optimal sub-set, and convert the two adjacent images into images having the same angle of view; perform coordinate alignment on pixels in the images having the same angle of view, and average overlapping pixels to obtain a stitched sub-image of the two adjacent images; and repeatedly execute a stitching process of the two adjacent images on all stitched sub-images to obtain the stitched image.

In a possible implementation mode, the driving circuit 1304 is further configured to: determine a blurred region in the stitched image according to a change in an optical flow field in the stitched image; obtain a filtered image by performing bilateral filtering on the blurred region; perform illumination correction on the filtered image through a preset illumination model; and obtain the environment image by fusing overlapping regions of two adjacent images corresponding to the blurred region according to a weight.

In a possible implementation mode, the driving circuit 1304 is further configured to: determine a position of a preset object in the environment image when the mixed display signal is a dynamic mixed display signal; move a virtual image of a virtual object in a current frame to the position, and adjust an angle and a size of the virtual image; and obtain the MR image by adjusting illumination and a shadow effect of the virtual image according to illumination detected in a real environment, and transmit the MR image to the display screen 1301 for display.

In a possible implementation mode, the driving circuit 1304 is further configured to: extract a plurality of feature points from the environment image; match the plurality of feature points with feature points of the preset object; and determine a position of a successfully-matched feature point in the environment image as the position of the preset object in the environment image.

In a possible implementation mode, the driving circuit 1304 is further configured to: superimpose and render a static virtual image on the environment image to obtain and display the MR image when the mixed display signal is a static mixed display signal.

In a possible implementation mode, the driving circuit 1304 is further configured to: turn off the image sensor array, and display an image of a virtual world when the MR apparatus receives a virtual display signal.

In a possible implementation mode, the driving circuit 1304 is further configured to: display the environment image when a live display signal is received.

Based on the same inventive concept, an embodiment of the present disclosure provides a mixed reality apparatus. The mixed reality apparatus includes: at least one processor, and a memory connected to the at least one processor, where the memory stores instructions executable by the at least one processor, and the at least one processor executes the instructions stored in the memory to perform the method for displaying a mixed reality described above.

Based on the same inventive concept, an embodiment of the present disclosure further provides a readable storage medium. The readable storage medium includes: a memory, where the memory is configured to store instructions, and the instructions cause an apparatus including the readable storage medium to complete the method for displaying a mixed reality described above when executed by a processor.

Those skilled in the art should understand that the embodiments of the present disclosure can be provided as methods, systems, or computer program products. Therefore, the embodiments of the present disclosure can be full hardware embodiments, full software embodiments, or software and hardware combined embodiments. Moreover, the embodiments of the present invention can employ the form of a computer program product that is implemented on one or more computer-available storage media (including, but not limited to, a disk memory, a compact disk read-only memory (CD-ROM), an optical memory, etc.) that include computer-available program codes.

The embodiments of the present disclosure are described with reference to a flowchart and/or block diagram of the method, the apparatus (system), and the computer program product in the embodiments of the present disclosure. It should be understood that each flow and/or block in the flowchart and/or block diagram and combinations of the flows and/or blocks in the flowchart and/or block diagram can be implemented by computer program instructions. These computer program instructions can be provided for a general-purpose computer, a special-purpose computer, an embedded processor, or a processor of another programmable data processing apparatus, to generate a machine. Therefore, the instructions executed by the computer or the processor of another programmable data processing apparatus generate a device for implementing a specific function in one or more flows in the flowchart and/or in one or more blocks in the block diagram.

These computer program instructions can also be stored in a computer-readable memory that can guide the computer or another programmable data processing apparatus to work in a specific way. Therefore, the instructions stored in the computer-readable memory generate a product including an instruction device. The instruction device implements a specific function in one or more flows in the flowchart and/or in one or more blocks in the block diagram.

These computer program instructions can also be loaded onto the computer or another programmable data processing apparatus, so that a series of operations and steps are executed on the computer or another programmable apparatus, thereby generating processing implemented by the computer. Therefore, the instructions executed on the computer or another programmable apparatus provide steps for implementing a specific function in one or more flows in the flow chart and/or in one or more blocks in the block diagram.

Apparently, those skilled in the art can make various modifications and variations to the present disclosure without departing from the spirit and scope of the present disclosure. In this way, it is intended that the present disclosure also encompass these modifications and variations if these modifications and variations to the present disclosure fall within the scope of the claims of the present disclosure and their equivalents.

What is claimed is:

1. A method for displaying a mixed reality (MR), applied to an MR apparatus, wherein the MR apparatus comprises a display screen, an eye tracker on a display surface of the display screen, and an image sensor array on a non-display surface of the display screen, a corresponding relation is between image sensors in the image sensor array and a plurality of display sub-regions in the display screen, and the method comprises:

after receiving a mixed display signal, determining a gaze point of a user on the display screen by tracking an eyeball of the user through the eye tracker;

determining a display sub-region at which the user gazes according to a corresponding relation between gaze points and display sub-regions in the display screen;

determining at least one first image sensor according to the corresponding relation between display sub-regions and image sensors in the image sensor array, and adjusting the at least one first image sensor to increase a resolution of an image generated by the at least one first image sensor, wherein a distance between a center point of a display sub-region corresponding to the first image sensor and the gaze point is less than a set distance; and obtaining and displaying an MR image by superimposing and rendering an environment image output by the image sensor array and a virtual image;

wherein the adjusting the at least one first image sensor comprises:

determining whether a gaze duration for which the gaze point remains in a display sub-region corresponding to the at least one first image sensor is greater than a preset threshold;

in response to determining that the gaze duration is less than or equal to the preset threshold, increasing the resolution of the image generated by the at least one first image sensor, so as to increase a resolution of a first image; and in response to determining that the gaze duration is greater than the preset threshold, keeping the at least one first image sensor in a working state, and displaying an image output by the at least one first sensor as the environment image in a full-screen mode.

2. The method according to claim 1, wherein before the superimposing and rendering the environment image output by the image sensor array and the virtual image, the method further comprises:

in response to determining that a total number of image sensors in the working state of the image sensor array is greater than 1, stitching a plurality of images output by the image sensor array into a stitched image; and generating the environment image by adjusting brightness and color of the stitched image.

3. The method according to claim 2, wherein the stitching the plurality of images output by the image sensor array into the stitched image comprises:

selecting an image from the plurality of images as a reference image, and stitching two adjacent images from the reference image until the plurality of images output by the image sensor array are stitched, wherein the stitching the two adjacent images is implemented by:

acquiring a plurality of matching points having a same image feature from the two adjacent images;

calculating translation matrixes, rotation matrixes, and intrinsic parameter matrixes corresponding to the plurality of matching points respectively;

calculating a homography matrix of each matching point according to the translation matrix, the rotation matrix, and the intrinsic parameter matrix of each matching point;

calculating each homography matrix through a least median robustness method, selecting matching points corresponding to homography matrixes satisfying a preset quality requirement to form an optimal sub-set, calculating a final homography matrix according to the optimal sub-set, and converting the two adjacent images into images having a same angle of view; and performing coordinate alignment on pixels in the images having the same angle of view, and averaging overlapping pixels to obtain a stitched sub-image of the two adjacent images; and repeatedly executing the stitching the two adjacent images on all stitched sub-images to obtain the stitched image.

4. The method according to claim 3, wherein the generating the environment image by adjusting brightness and color of the stitched image comprises:

determining a blurred region in the stitched image according to a change in an optical flow field in the stitched image;

obtaining a filtered image by performing bilateral filtering on the blurred region;

performing illumination correction on the filtered image through a preset illumination model; and obtaining the environment image by fusing overlapping regions of two adjacent images corresponding to the blurred region according to a weight.

5. The method according to claim 1, wherein the obtaining and displaying the MR image by superimposing and rendering the environment image output by the image sensor array and the virtual image comprises:

determining a position of a preset object in the environment image when the mixed display signal is a dynamic mixed display signal;

moving a virtual image of a virtual object in a current frame to the position, and adjusting an angle and a size of the virtual image; and obtaining the MR image by adjusting illumination and a shadow effect of the virtual image according to illumination detected in a real environment, and transmitting the MR image to the display screen for display.

6. The method according to claim 5, wherein the determining the position of the preset object in the environment image comprises:

extracting a plurality of feature points from the environment image;

matching the plurality of feature points with feature points of the preset object; and determining a position of a successfully-matched feature point in the environment image as the position of the preset object in the environment image.

7. The method according to claim 1, wherein the obtaining and displaying the MR image by superimposing and rendering the environment image output by the image sensor array and the virtual image comprises:

obtaining and displaying the MR image by superimposing and rendering a static virtual image on the environment image when the mixed display signal is a static mixed display signal.

8. The method according to claim 1, further comprising:
when a virtual display signal is received, turning off the image sensor array, and displaying an image of a virtual world.

9. The method according to claim 1, further comprising:
displaying the environment image when a live display signal is received.

10. The method according to claim 1, wherein fields of view of two adjacent image sensors in the image sensor array partially overlap each other.

11. A mixed reality apparatus, comprising:

a display screen;

an eye tracker on a display surface of the display screen;

an image sensor array on a non-display surface of the display screen, wherein a corresponding relation is between image sensors in the image sensor array and a plurality of display sub-regions in the display screen; and a driving circuit configured to:

control the eye tracker to track an eyeball of a user, so as to determine a gaze point of the user on the display screen after receiving a mixed display signal; determine, according to a corresponding relation between gaze points and display sub-regions in the display screen and the corresponding relation between display sub-regions and image sensors in the image sensor array, at least one first image sensor corresponding to the gaze point; adjust the at least one first image sensor, so as to increase a resolution of an image generated by the at least one first image sensor, wherein a distance between a center point of a display sub-region corresponding to the first image sensor and the gaze point is less than a set distance, and fields of view of two adjacent image sensors in the image sensor array partially overlap each other; and superimpose and render an environment image output by the image sensor array and a virtual image, so as to obtain and display an MR image;

wherein the driving circuit is further configured to:

determine whether a gaze duration for which the gaze point remains in a display sub-region corresponding to the at least one first image sensor is greater than a preset threshold;

in response to determining that the gaze duration is less than or equal to the preset threshold, increase the resolution of the image generated by the at least one first image sensor, so as to increase a resolution of a first image; and in response to determining that the gaze duration is greater than the preset threshold, keep the at least one first image sensor in a working state, and display an image output by the at least one first sensor as the environment image in a full-screen mode.

12. A non-transitory readable storage medium, comprising a memory, wherein the memory is configured to store instructions, and the instructions, when executed by a processor, cause an apparatus comprising the readable storage medium to perform:

after receiving a mixed display signal, determining a gaze point of a user on a display screen by tracking an eyeball of the user through an eye tracker;

determining a display sub-region at which the user gazes according to a corresponding relation between gaze points and display sub-regions in the display screen;

determining at least one first image sensor according to a corresponding relation between display sub-regions and image sensors in an image sensor array, and adjusting the at least one first image sensor to increase a resolution of an image generated by the at least one first image sensor, wherein a distance between a center point of a display sub-region corresponding to the first image sensor and the gaze point is less than a set distance; and obtaining and displaying an MR image by superimposing and rendering an environment image output by the image sensor array and a virtual image;

wherein the instructions, when executed by the processor, further cause the apparatus comprising the readable storage medium to perform:

determining whether a gaze duration for which the gaze point remains in a display sub-region corresponding to the at least one first image sensor is greater than a preset threshold;

in response to determining that the gaze duration is less than or equal to the preset threshold, increasing the resolution of the image generated by the at least one first image sensor, so as to increase a resolution of a first image; and in response to determining that the gaze duration is greater than the preset threshold, keeping the at least one first image sensor in a working state, and displaying an image output by the at least one first sensor as the environment image in a full-screen mode.

13. The apparatus according to claim 11, wherein the driving circuit is further configured to:

in response to determining that a total number of image sensors in the working state of the image sensor array is greater than 1, stitch a plurality of images output by the image sensor array into a stitched image; and generate the environment image by adjusting brightness and color of the stitched image.

14. The apparatus according to claim 13, wherein the driving circuit is further configured to:

select an image from the plurality of images as a reference image, and stitch two adjacent images from the reference image until the plurality of images output by the image sensor array are stitched, wherein the stitching the two adjacent images is implemented by:

acquiring a plurality of matching points having a same image feature from the two adjacent images;

calculating translation matrixes, rotation matrixes, and intrinsic parameter matrixes corresponding to the plurality of matching points respectively;

calculating a homography matrix of each matching point according to the translation matrix, the rotation matrix, and the intrinsic parameter matrix of each matching point;

calculating each homography matrix through a least median robustness method, selecting matching points corresponding to homography matrixes satisfying a preset quality requirement to form an optimal sub-set, calculating a final homography matrix according to the optimal sub-set, and converting the two adjacent images into images having a same angle of view; and performing coordinate alignment on pixels in the images having the same angle of view, and averaging overlapping pixels to obtain a stitched sub-image of the two adjacent images; and repeatedly execute the stitching the two adjacent images on all stitched sub-images to obtain the stitched image.

15. The apparatus according to claim 14, wherein the driving circuit is further configured to:

determine a blurred region in the stitched image according to a change in an optical flow field in the stitched image;

obtain a filtered image by performing bilateral filtering on the blurred region;

perform illumination correction on the filtered image through a preset illumination model; and obtain the environment image by fusing overlapping regions of two adjacent images corresponding to the blurred region according to a weight.

16. The apparatus according to claim 11, wherein the driving circuit is further configured to:

determine a position of a preset object in the environment image when the mixed display signal is a dynamic mixed display signal;

move a virtual image of a virtual object in a current frame to the position, and adjust an angle and a size of the virtual image; and obtain the MR image by adjusting illumination and a shadow effect of the virtual image according to illumination detected in a real environment, and transmit the MR image to the display screen for display.

17. The apparatus according to claim 16, wherein the driving circuit is further configured to:

extract a plurality of feature points from the environment image;

match the plurality of feature points with feature points of the preset object; and determine a position of a successfully-matched feature point in the environment image as the position of the preset object in the environment image.

18. The apparatus according to claim 11, wherein the driving circuit is further configured to:

obtain and display the MR image by superimposing and rendering a static virtual image on the environment image when the mixed display signal is a static mixed display signal.

\* \* \* \* \*